(12) United States Patent
Marchetti

(10) Patent No.: US 9,994,297 B2
(45) Date of Patent: Jun. 12, 2018

(54) PANEL FOR CONTROLLING THE AERODYNAMIC PHENOMENA ON A BODY

(71) Applicant: ALENIA AERMACCHI SPA, Venegono Superior (VA) (IT)

(72) Inventor: Danilo Marchetti, Venegono Superiore (IT)

(73) Assignee: ALENIA AERMACCHI S.P.A., Venegono Superiore (VA) (IT)

( * ) Notice: Subject to any disclaimer, the term of this patent is extended or adjusted under 35 U.S.C. 154(b) by 0 days. days.

(21) Appl. No.: 14/426,334

(22) PCT Filed: Aug. 30, 2013

(86) PCT No.: PCT/IB2013/058141
§ 371 (c)(1),
(2) Date: Mar. 5, 2015

(87) PCT Pub. No.: WO2014/037857
PCT Pub. Date: Mar. 13, 2014

(65) Prior Publication Data
US 2015/0217849 A1  Aug. 6, 2015

(30) Foreign Application Priority Data
Sep. 5, 2012  (IT) .............................. TO2012A0769

(51) Int. Cl.
*B64C 1/00*   (2006.01)
*B64C 21/02*  (2006.01)
(Continued)

(52) U.S. Cl.
CPC .............. *B64C 1/0009* (2013.01); *B64C 1/40* (2013.01); *B64C 21/02* (2013.01); *B64C 21/025* (2013.01);
(Continued)

(58) Field of Classification Search
CPC ......... B64C 1/0009; B64C 21/02; B64C 1/40; B64C 21/025; B64C 2230/22; F15D 1/12;
(Continued)

(56) References Cited

U.S. PATENT DOCUMENTS 4,641,799 A    2/1987 Quast et al.
4,664,345 A *  5/1987 Lurz ..................... B64C 21/025
                                                        244/130

(Continued)

OTHER PUBLICATIONS

International Search Report for International Application No. PCT/IB2013/058141 dated Jan. 21, 2014 (2 pages).

*Primary Examiner* — Valentina Xavier
(74) *Attorney, Agent, or Firm* — Merchant & Gould P.C.

(57) ABSTRACT

A panel (3) for controlling the aerodynamic phenomena generated by a body (0) to be positioned on a surface of an aircraft (V). The panel (3) can be associated with the base of the body (0) and includes at least one inlet aperture (322) and at least one outlet aperture (322') placed in communication with each other, through which a portion of a fluid flow (W) in which the body (0) is immersed can selectively pass. The inlet aperture (322) is located upstream of the body (0) and the outlet aperture (322') is located downstream of the body (0), with respect to the direction of the fluid flow (W).

12 Claims, 4 Drawing Sheets

(51) Int. Cl.
  *G01P 5/165* (2006.01)
  *G01P 13/02* (2006.01)
  *F15D 1/12* (2006.01)
  *F15D 1/00* (2006.01)
  *B64C 1/40* (2006.01)

(52) U.S. Cl.
  CPC ............ *F15D 1/0055* (2013.01); *F15D 1/12* (2013.01); *G01P 5/165* (2013.01); *G01P 13/025* (2013.01); *B64C 2230/22* (2013.01); *Y02T 50/166* (2013.01)

(58) Field of Classification Search
  CPC ...... F15D 1/0055; G01P 13/025; G01P 5/165; Y02T 50/166
  See application file for complete search history.

(56) References Cited

U.S. PATENT DOCUMENTS

| | | | | |
|---|---|---|---|---|
| 5,628,565 | A * | 5/1997 | Hagen | G01K 13/02 374/138 |
| 2002/0190165 | A1* | 12/2002 | Glezer | B64C 21/04 244/207 |
| 2009/0200416 | A1* | 8/2009 | Lee | B64B 1/30 244/30 |
| 2010/0018322 | A1* | 1/2010 | Neitzke | F15D 1/12 73/861.22 |
| 2010/0181434 | A1* | 7/2010 | Powell | B64C 21/08 244/209 |

\* cited by examiner

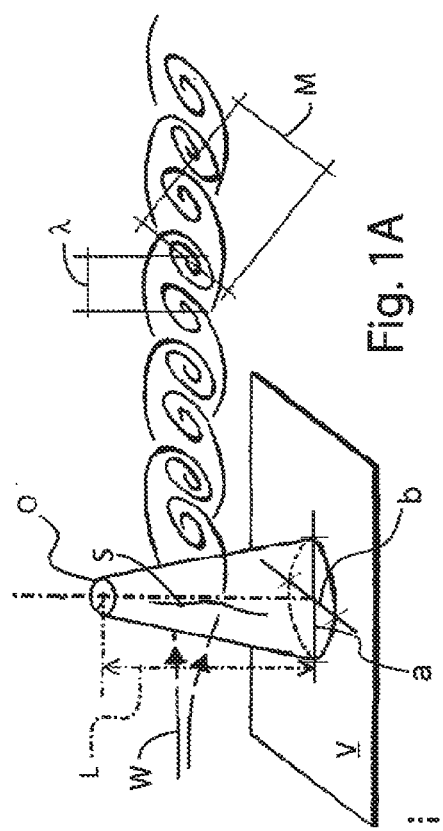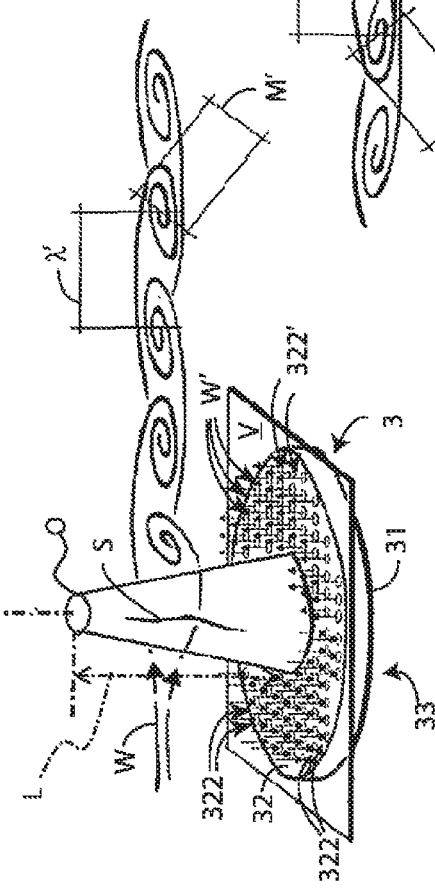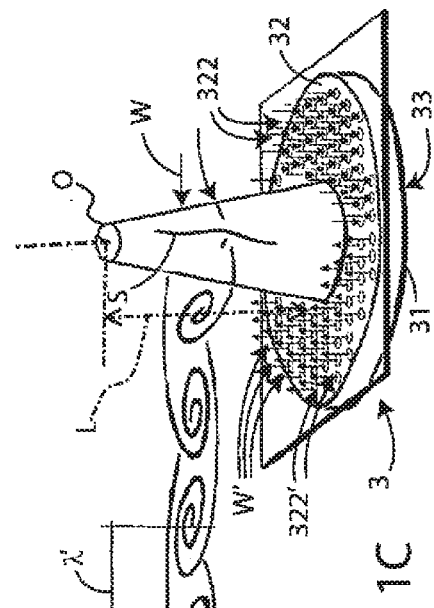

PANEL FOR CONTROLLING THE AERODYNAMIC PHENOMENA ON A BODY

This application is a National Stage Application of PCT/IB2013/058141, filed 30 Aug. 2013, which claims benefit of Serial No. TO2012A000769, filed 5 Sep. 2012 in Italy and which applications are incorporated herein by reference. To the extent appropriate, a claim of priority is made to each of the above disclosed applications.

BACKGROUND

The present invention relates to a panel adapted to control aerodynamic phenomena on a body immersed in a subsonic fluid current.

Aerodynamic phenomena occurring in transonic conditions on a body having a conical, cylindrical or another aerodynamically "squat" shape create shock waves that interact with the development of the boundary layer, thus causing disorderly recirculation phenomena or air flow turbulences.

Such turbulences may consist, for example, of alternated separation and reattachment of vortex structures; this phenomenon is called vortex shedding.

A body comprising at least one circular or semicircular or elliptical or aerodynamically squat portion creates a trail of vortices detaching from the body itself in an alternated, non-stationary manner when the body itself is hit by a subsonic fluid flow.

The detachment frequency and intensity of the vortices are a function of the size of the body itself and of the incident fluid current. This phenomenon increases aerodynamic resistance, leading to the structure being subject to greater stress. Said stress involves both the body itself and the aircraft portion whereto said body has been applied.

Such aerodynamic phenomena, like vortex shedding, arise on high-performance civil and military aircraft. Of course, aircraft of this type include a computerized flight control system, abbreviated with the acronym FCS.

To be fully functional, such a system requires real-time acquisition of a plurality of parameters, such as, for example, aircraft position and trim and flight conditions in terms of speed, height and pressure. These parameters are normally referred to as air data, the acquisition of which is entrusted to an additional data acquisition system called air data sensor or ADS.

A typical system for acquiring said parameters performs multiple acquisition of redundant data.

The redundant acquisition of said parameters requires the installation, in various parts of the aircraft, of at least two structures, within which a plurality of sensors and/or probes are suitably arranged in order to acquire said air data.

Such a structure is typically cylindrical or conical in shape, referred to as integrated multi function probe or IMFP. Said IMFP has a substantially longitudinal extension, perpendicular to the flight direction and normal to the surface of the aircraft.

Through said sensors and/or probes, which are arranged in a plurality of slots provided at different angles of the circular section of said IMFP, the acquisition system can acquire the air data, such as local pressure.

The shape of said circular-section IMFP's causes aerodynamic phenomena, like vortex shedding, when subjected to a subsonic flow.

Vortex shedding causes a pressure drop downstream of said IMFP, in the flow direction, resulting in erroneous detection of data which are essential to the aircraft's computerized control system.

Furthermore, in particular flight and height conditions the vortex shedding phenomenon also causes increased noise in frequency bands which can also be heard by the human ear.

In summary, the most important problems caused by these aerodynamic phenomena are:
- structural fatigue caused by increased aerodynamic resistance;
- noise generation;
- acquisition of disturbed signals, e.g. due to local pressure drop.

The prior art has attempted to solve these technical problems by acting upon the shape of said body or IMFP, by adapting its profile in order to make it more aerodynamic and minimize the vortex shedding phenomenon.

Sensors, antennae or aerodynamic excrescences are typically installed to the outer covering of an airplane on a smooth surface created with special care from the aerodynamic viewpoint, so as to minimize wall-triggered turbulences that might hit the body and jeopardize the proper operation thereof. Directly modifying the shape of the body or object in order to make it compatible with the local aerodynamic flow field is not always possible.

The shape of the body is often dictated by functional requirements. Functional requirements often deviate from aerodynamic ones, so that the body will tend to develop aerodynamic phenomena, such as turbulent and vortical structures, which may originate the above-described problems.

These solutions cannot effectively eliminate such aerodynamic phenomena because aerodynamic phenomena vary as a function of many parameters, so that it is difficult to create an aerodynamic profile capable of ensuring high-performance in every flight condition of an aircraft, such as speed, altitude, etc.

The solutions known in the art, in fact, are aimed at solving particular aerodynamic phenomena in particular flight conditions, but they may become sources of other uncontrollable aerodynamic phenomena in other flight conditions, different from those for which they have been designed or studied.

U.S. Pat. No. 4,664,345 has disclosed a device that can eliminate the problems relating to the separation of the boundary layer of a downstream laminar flow, with respect to the air flow, caused by a step in the aircraft structure. Said device is unidirectional.

It is also know from the above-mentioned US patent that the device has 2 distinct chambers connected by a valve, each chamber being assigned a univocal function as flow inlet or outlet.

It is known from U.S. Pat. No. 4,664,345 a device comprising suction inlets in the surface just upstream of a disturbance and blowing outlets just downstream of the disturbance and by a flow channel interconnecting these inlets and outlets. Passage of a portion of the flowing medium through these passages is automatically assured due to a pressure differential between the inlets and outlets.

Furthermore it is also known from U.S. Pat. No. 5,628,565 an aerodynamic air data sensing probe adapted for mounting to an air vehicle and capable of generating signals related to a fluid flowing relative to the air vehicle. A fluid inlet positioned on a first end of the strut faces generally transverse to the fluid flow selectively admits fluid to an internal strut cavity due to a pressure differential there across. In operation, the pressure differential forms between the first end surface of the aerodynamically-shaped, forward-inclined strut and probe exhaust ports.

SUMMARY

The present invention aims at providing a panel associated with a body for controlling the aerodynamic phenomena generated by the body, which has an aerodynamically squat shape, and which can be positioned on the surface of an aircraft; said panel comprises at least one inlet aperture and at least one outlet aperture, through which a portion of the fluid flow in which said body or object is immersed can pass, thereby generating an output flow that interferes with the aerodynamic phenomena generated by the body and thus eliminating the above-mentioned problems. The solution proposed herein allows to dampen the pressure and/or temperature and/or velocity oscillations generated by the incident flow, while reducing the total weight of the panel and attenuating any acoustic disturbance.

BRIEF DESCRIPTION OF THE DRAWINGS

The features and advantages of the panel according to the present invention will become apparent from the following patent description and from the annexed drawings, wherein:

FIGS. 1A, 1B and 1C show a body or object that creates aerodynamic phenomena; in particular, FIG. 1A shows the body without the panel according to the present invention, whereas FIGS. 1B and 1C show the body with the panel positioned at its base, according to a preferred embodiment of said panel;

DETAILED DESCRIPTION

With reference to the above-listed drawings, the panel 3 is associated with a body "O" for the purpose of controlling, preferably in a passive way, the aerodynamic phenomena generated by the body "O" with which it is associated. Said body "O" is placed on a surface of an aircraft "V", which surface is preferably flat or slightly curved, and has at least one longitudinal extension "L" which is normal to the surface of the aircraft "V" whereon said body "O" is positioned. Said body "O", or at least a portion thereof, is directly in contact with the surface of the aircraft "V".

Said panel is preferably associated with the base of said body "O". The body "O" comprises at least one region "S" with at least one profile having a circular or semicircular or elliptical or aerodynamically squat section, of the body "O" itself. Said profile region "S" is normally subject to shock waves which are characteristic of transonic and/or supersonic conditions. Said local transonic or supersonic conditions are generated by velocity variations imposed on the air flow, of the incident subsonic fluid, deviated by the outer profile of the body "O". The interaction between these complex and particular aerodynamic phenomena promotes, for example, the formation of a trail of alternate-detachment vortices.

Said body "O", as shown by way of example in FIG. 1A, is substantially shaped like a cone or a pyramid or a truncated cone or a truncated pyramid. The base of said body "O" has a diameter ratio such that the ratio between the major diameter and the minor diameter is less than two, as shown by the following formula: a/b<2.

Said panel 3 comprises at least one inlet aperture 322 and at least one outlet aperture 322' placed in communication with each other, through which a portion of the fluid flow "W" in which said body "O" is immersed can pass.

Said inlet aperture 322 is located upstream of said body "O" and said outlet aperture 322' is located downstream of said body "O", with respect to the direction of the fluid flow "W".

For the purposes of the present invention, the expression "aperture located upstream of the body "O"" means that said aperture, depending on the direction of the fluid flow "W", is hit by the flow before the body "O", because it is in front of the body "O" with respect to the direction of the fluid "W".

For the purposes of the present invention, the expression "aperture located downstream of the body "O"" means that said aperture, depending on the direction of the fluid flow "W", is hit by the flow after the body "O", because it is behind the body "O" with respect to the direction of the fluid "W".

Figure 2:
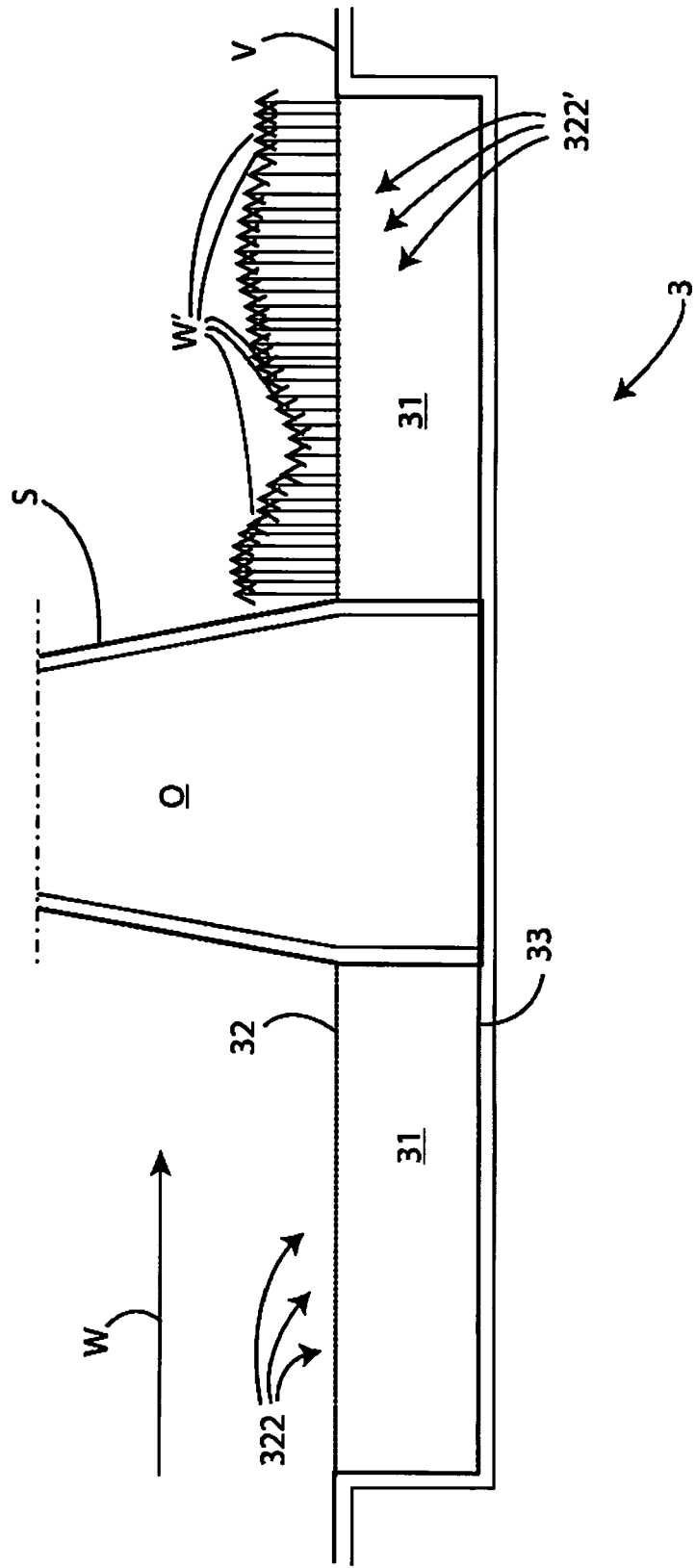
FIG. 2 is a sectional side view of the preferred embodiment of the panel associated with the body or object of FIGS. 1B and 1C, showing at least one inlet aperture and at least one outlet aperture in communication with each other.
Figure 3:
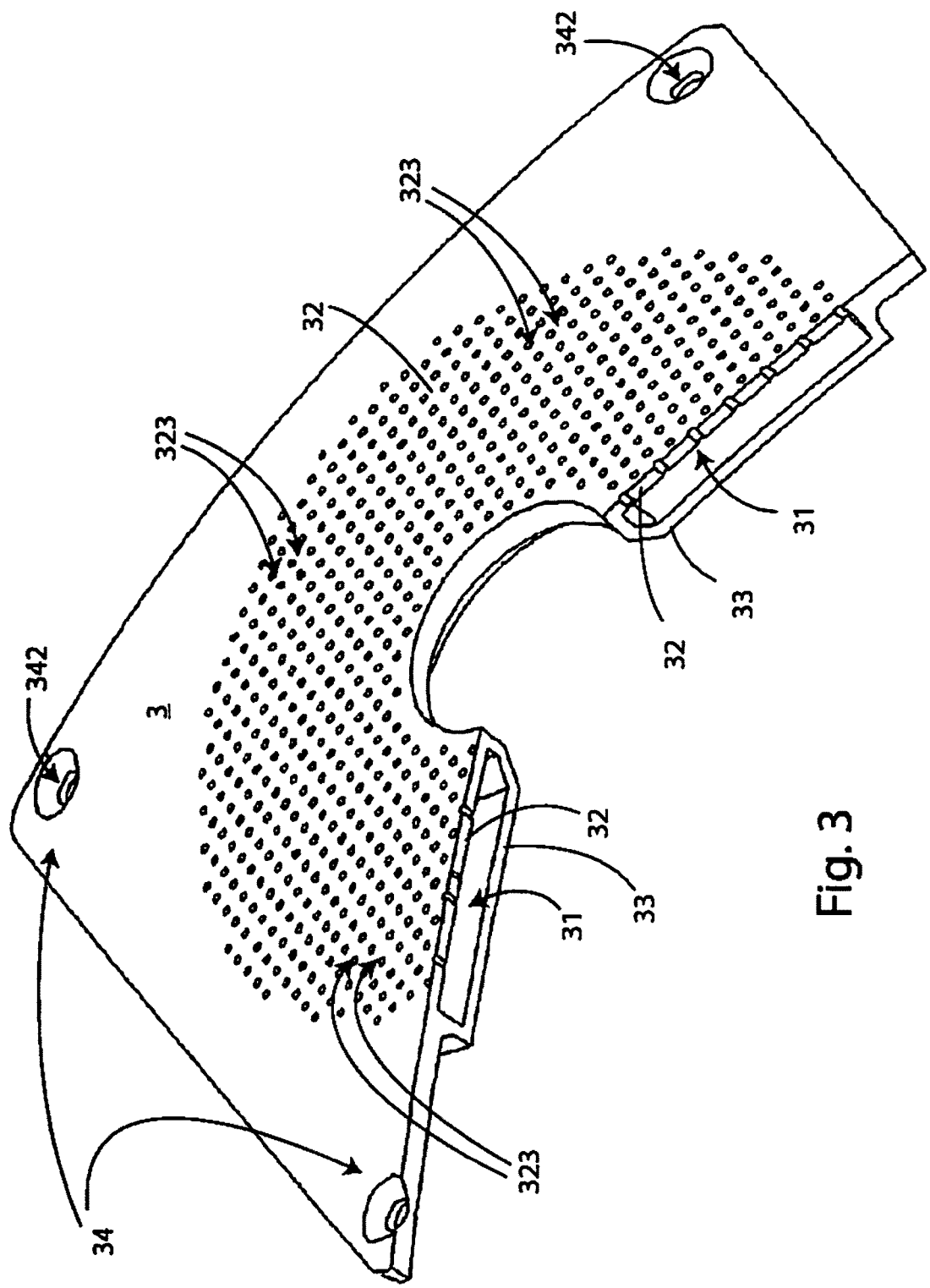
FIG. 3 shows a perspective view of a section of the panel according to the present invention, wherein the cavity communicating with the inlet and outlet apertures is visible.

More in detail, said at least one outlet aperture 322' is so shaped as to generate an output fluid flow W' which is mostly perpendicular to the direction of the fluid flow "W" acting upon said body "O", as shown by way of example in FIG. 2.

For the purposes of the present invention, the expression "mostly perpendicular output fluid flow" means that the direction of maximum intensity of the fluid is substantially perpendicular to the direction of the fluid flow acting upon said body.

In the preferred embodiment, said at least one outlet aperture 322' is so shaped as to generate an output fluid flow "W'" which is substantially perpendicular to both the direction of the fluid flow "W" acting upon said body "O" and the surface of the aircraft "V" whereon the body "O" is positioned.

In general, the panel 3 according to the present invention is multidirectional, i.e. it can control undesired aerodynamic phenomena even if the fluid flow "W" acting upon the body "O" has, for example, an opposite-sign equal direction, i.e. a reverse flow. In particular, said at least one inlet aperture 322 can become at least one outlet aperture 322'; at the same time, the outlet aperture 322' can become an inlet aperture 322.

Said panel comprises a cavity 31 in communication with said at least one inlet aperture 322 and at least one outlet aperture 322', which defines the path followed by said portion of the flow "W".

Preferably, said panel 3 comprises only one cavity 31.

In the preferred embodiment, the cavity 31 is toroidal and preferably has a constant height, as shown by way of example in FIGS. 1B, 1C, 2 and 3.

More preferably, the toroidal cavity 31 has a circular perimeter.

In the preferred embodiment, shown in FIGS. 1B-3, said at least one inlet aperture and said at least one outlet aperture are a plurality of through holes 323.

The present embodiment allows to obtain a universal panel that can adapt itself to variations in the flow "W"; in fact, depending on the direction of the fluid flow "W", the through holes 323 may be either inlet apertures 322 or outlet apertures 322'; by way of example, if the flow "W" changes direction and becomes opposite to the previous direction, the through holes 323 that previously were inlet apertures 322 will become outlet apertures 322', and vice versa, while still preserving the technical characteristics that control the aerodynamic phenomena acting upon the body "O".

The size of a single hole 323 is preferably in the range of 1÷2 mm.

The panel 3 has an average porosity in the range of, for example, 5 to 20%.

Describing more in detail the preferred embodiment, said cavity 31 is defined by a face-sheet 32, comprising said plurality of through holes 323, and a back-sheet 33, defining the base of the panel 3.

The face-sheet 32 preferably has an average porosity in the range of 8 to 12%, thus ensuring control of the aerodynamic flows as aforementioned and making the panel 3 of the present invention suitable for adjusting the flow of any kind of body "O".

Any condensate or rain water that might accumulate within the cavity 31 will be automatically drained through the same holes 323 of the face-sheet 32. The panel 3 according to the present invention may also include additional draining systems.

Figure 4:
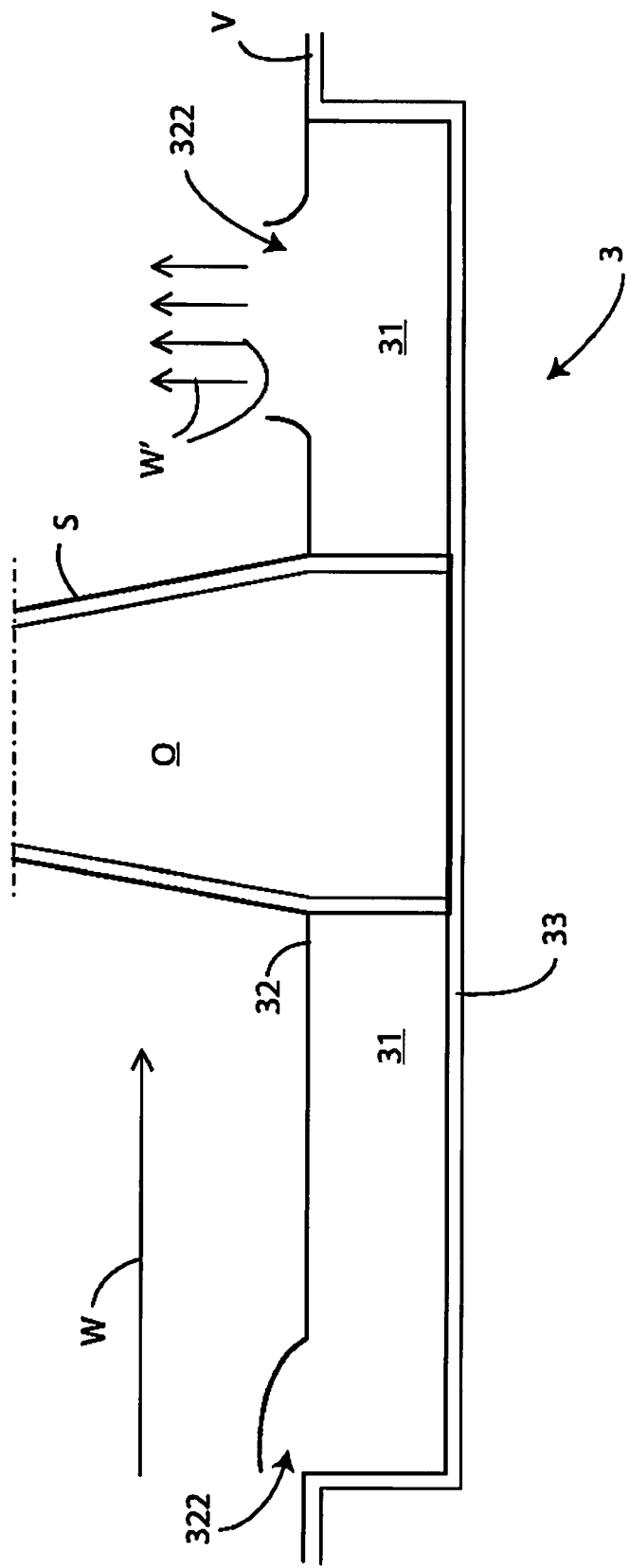
FIG. 4 shows a second embodiment of the panel according to the present invention.

In the second embodiment illustrated in FIG. 4, there are only one inlet aperture 322 and only one outlet aperture 322'. Said inlet aperture is located upstream of the body "O", at such a distance that the same aperture 322 can cause aerodynamic phenomena that can interfere with the body "O". The outlet aperture 322' is so shaped as to generate an output fluid flow "W'" which is substantially perpendicular to both the direction of the fluid flow "W" acting upon said body "O" and the surface of the aircraft "V" whereon the body "O" is positioned.

In general, the panel 3 is preferably secured to the aircraft "V" by means of at least one fastening portion 34.

Said fastening portion 34 comprises at least one through hole into which a fastening means is inserted, e.g. a screw, in order to secure the panel 3 to the aircraft "V".

In a first embodiment, the panel 3 is placed on the flat surface of the aircraft "V", at the base of the body "O" with which it is associated.

In the preferred embodiment, as shown in FIGS. 1B, 1C and 2, the panel 3 is integrated into the flat surface of the aircraft "V" whereto the body "O" is applied, thus not affecting the profile of the theoretical surface of the aircraft "V". This embodiment allows to recover the offset of the pressure signal that may occur in the embodiment wherein the panel 3 is placed on the flat surface of the aircraft "V".

Preferably, said panel 3 is made of nylon or aluminium alloy, preferably by fast sintering or numerical-control mechanical machining, or it is made of composite materials by using preformed moulds.

The panel 3, which is preferably perforated, may be made as one piece, e.g. by only using the sintering technique, or may be assembled from several pieces, if manufactured by using the other techniques mentioned above.

The holes 323 may be made while manufacturing the panel 3 itself, or may be made during a drilling step after having made the face-sheet 32.

In the assembled embodiment of the panel 3, the face-sheet 32 can be assembled together with the back-sheet 33, thus creating the cavity 31.

As aforementioned, said bodies "O" are aerodynamic protuberances whose shape and function do not allow for any aerodynamic improvements, but they include, for example, various types of sensors that provide indispensable measurements for the correct navigation of the aircraft. For example, said bodies "O" are conical probes called IMFP (Integrated Multi Function Probe). The control of the aerodynamic flows of a body "O" allows, therefore, to improve the quality of the pressure signals recorded by an aircraft's on-board system, for the purpose of ensuring a more accurate, precise and univocal indication of the height, speed and trim of the aircraft itself during the flight. This embodiment applies the concept of passive porosity, thus eliminating or drastically reducing the aerodynamic disturbance generated by the turbulent trail downstream of a body "O" on the aircraft in transonic flight conditions. In practice, the panel according to the present invention acts indirectly at the base of the body "O" with which it is associated, by generating a number of output fluid flows "W'" which are orthogonal to the main plane in which the vortex structures develop, thereby providing an effective solution to the problems mentioned above and illustrated, for example, in FIGS. 1A-1C.

In an alternative embodiment (not shown), said body "O" can rotate about its own longitudinal axis of the longitudinal extension "L", which substantially coincides with the normal to the surface of the aircraft "V" whereon it is located. The panel 3 remains stationary with respect to the surface of the aircraft "V", while the body "O" can turn.

As aforementioned, the panel 3 according to the present invention may be either associated with the body "O", by positioning the same panel 3 on the flat surface of the aircraft "V", or integrated with the surface of the aircraft "V", thus becoming a part of the same flat surface, whereon the body "O" to be associated with the panel 3 will be placed.

The panel according to the present invention allows to obtain a significant reduction in the magnitudes and frequencies of the aerodynamic phenomena. The resulting magnitudes "M'" of the vortices generated by the body "O", with which the panel 3 according to the present invention has been associated, are reduced by up to 50% compared to the magnitudes "M" of an aerodynamic phenomenon normally generated by the body "O". The panel 3 according to the present invention allows to obtain a reduction in the frequency associated with the wavelength "λ" of said aerodynamic phenomena, e.g. as shown in FIG. 1A. The frequencies associated with the resulting wavelengths "λ'" of the vortices generated by the body "O", with which the panel 3 according to the present invention has been associated, are reduced by as much as 50% compared to the frequencies associated with the wavelengths "λ" of an aerodynamic phenomenon normally generated by the body "O".

Such reductions can be observed by comparing FIGS. 1A, 1B e 1C.

The panel according to the present invention allows to control the aerodynamic flows within very broad ranges of aircraft speed, trim and altitude. The high performance of the panel 3 according to the present invention is mainly due to the frequency decoupling that is effected between the trail vortices of the body "O" and the vibratory environment of the aircraft.

The method for controlling the aerodynamic phenomena generated by a body "O" placed on a flat surface of an aircraft (V), implemented by the panel according to the present invention, essentially comprises the following steps:

detecting an aerodynamic phenomenon generated by the body "O";
 channelling a portion of a fluid flow "W" in which said body "O" is immersed upstream of the same body "O" with respect to the direction of the fluid flow "W";

directing the channelled fluid downstream of said body "O", with respect to the direction of the fluid flow "W", thereby generating an output fluid flow "W'" interfering with the fluid flow "W".

Besides being carried out passively as in the embodiments illustrated herein, the step of detecting an aerodynamic phenomenon may be semi-automatic, e.g. by detecting a pressure drop in the sensors comprised in the body "O". When an aerodynamic phenomenon is detected, through an actuator or a mechanical system it is possible to open at least one inlet aperture 322 and then go to the step of channeling a portion of the flow.

Said actuator can be associated with a door adapted to selectively open or close an inlet aperture 322 similar to that shown in FIG. 4.

The step of channeling a portion of the flow is carried out as previously described.

In the case of active detection of the aerodynamic phenomenon, while opening the inlet aperture 322 it is possible, through an actuator or a mechanical system, to open also said outlet aperture 322', and thus be able to switch to the next step of directing the channelled fluid.

This last step is carried out by generating an output fluid flow "W'" which is mostly perpendicular to the flow "W" and preferably vertical, e.g. normal to the surface of, the aircraft "V" whereon the body "O" is located.

A further advantage obtained by installing the panel 3 according to the present invention lies in a general reduction of the dispersion or noise of the pressure signal acquired by the sensors or probes, leading to a monotonic and regular pressure-velocity correlation curve. Such linearity allows, as a result, to reconstruct or determine, in a univocal manner, the air parameters essential to the pilot and to the FCS control system.

In summary, the panel 3 according to the present invention provides the following advantages:
  aerodynamic load reduction; the aerodynamic loads acting upon the body "O", especially those orthogonal to the main direction of the aerodynamic flow "W", are minimized in terms of both the frequency associated with the wavelength "λ'" and magnitude "M'", which is beneficial in view of the structural dimensioning for limit loads and fatigue loads of the body "O" and the surface of the aircraft "V" whereto the body "O" is to be applied, thus allowing the use of a lighter structure and gaining the advantages of a lower total weight;
  acoustic disturbance reduction; this improves cockpit comfort, especially in those situations where sensors, antennae, aerodynamic excrescences are positioned near the cockpit of the aircraft "V";
  improved signal acquisition; in this specific case, local pressure and/or temperature and/or velocity measurements are more accurate, and the frequency at which the measured parameter varies is reduced. This last feature goes to advantage of the frequency decoupling from any other vibratory fields where the sensor may have to operate.

As far as the integration of this invention into an airplane is concerned, no restrictions apply in terms of application or time duration. No extraordinary maintenance work is required. Production of the panel is simple and economical, and can be extended to the use of metal materials based on aluminium alloys.

In the specific case wherein the panel is arranged in the proximity of the sensor cones of the IMFP, the same air data system will be able to provide a "cleaner" signal with reduced noise and a more "regular" signal with reduced variance, thereby reducing the work to be done by data processing and filtering systems and improving the output quality and response speed of the flight control system.

The panel according to the present invention requires no modifications to the structure of the body "O" with which it is associated.

REFERENCE NUMERALS

Panel 3
Cavity 31
Face-sheet 32
Inlet aperture 322
Outlet aperture 322'
Hole 323
Back-sheet 33
Fastening portions 34
Through hole 342
Aircraft "V"
Body "O"
Profile "S"
Wavelength "λ"
Resulting wavelength "λ'"
Magnitude "M"
Resulting magnitude "M'"
Fluid flow "W"
Output fluid flow "W'"
Max. longitudinal dimension of body "a"
Max. lateral dimension of body "b"

The invention claimed is:

1. A panel associated with a body for controlling aerodynamic phenomena generated by the body with which the aerodynamic phenomena is associated; said body is suitable to be positioned on a surface of an aircraft; said body having a longitudinal extension normal to the surface of the aircraft;
  a fluid flow acts upon said body, thereby generating undesired aerodynamic phenomena;
  the panel is distinct from said body and assembled at a base of said body positioned in correspondence to a portion of the body which is in contact with the surface of the aircraft;
  the panel comprises an integrally formed inlet aperture and an integrally formed outlet aperture, and the panel defines a cavity; said cavity is in communication both with said inlet aperture and with said outlet aperture, defining a path where a portion of the flow can selectively pass;
  said inlet aperture, which selectively allows a portion of the fluid flow to enter the panel, is located upstream of said body with respect to a direction of the fluid flow, and said outlet aperture, from which an output fluid flow exits the panel, is located downstream of said body, with respect to the direction of the fluid flow;
  said outlet aperture is shaped to generate an output fluid flow which is substantially perpendicular to the direction of the fluid flow acting upon said body, interfering with the aerodynamic phenomena generated by the body;
  said body is an aerodynamic protuberance comprising a sensor, a probe, an antenna, an air data sensor or an integrated multi-function probe, and said body comprises a region with at least one profile having a circular or semicircular or elliptical section.

2. The panel according to claim 1, wherein said outlet aperture is shaped to generate an output fluid flow which is substantially perpendicular and the panel comprises only one cavity.

3. The panel according to claim 1, wherein said body comprises in an interior, electronic measurement and communication devices suitable to be electrically connected to the aircraft.

4. The panel according to claim 1, wherein said cavity is toroidal and surrounds the body.

5. The panel according to claim 1, wherein said inlet aperture and said outlet aperture comprise a plurality of through holes.

6. The panel according to claim 5, wherein said cavity is defined by a face-sheet, comprising said plurality of holes, and a back-sheet, defining the base of the panel.

7. The panel according to claim 4, wherein said panel has an average porosity in the range of 5 to 20%.

8. A method for controlling aerodynamic phenomena generated by a body positioned on a surface of an aircraft and immersed in a fluid flow;

the method comprises the following steps:

providing a panel comprising an integrally formed inlet aperture and an integrally formed outlet aperture, the panel defining a cavity; said cavity is in communication both with said inlet aperture and with said outlet aperture, defining a path where a portion of the flow can selectively pass; the panel is distinct from said body and assembled at a base of said body positioned in correspondence to a portion of the body which is in contact with the surface of the aircraft;

detecting arising of an aerodynamic phenomenon generated by the body, whether actively or passively;

channelling a portion of the fluid flow in which said body is immersed upstream of the body with respect to a direction of the fluid flow and into the inlet aperture of the panel;

directing the channelled fluid through the cavity and out the outlet aperture of the panel downstream of said body, with respect to the direction of the fluid flow, thereby generating an output fluid flow interfering with the fluid flow;

said output flow is substantially perpendicular to the fluid flow.

9. An aircraft comprising a surface comprising an assembly comprising a panel and a body according to claim 1.

10. The aircraft according to claim 9, in which said panel is integrated into the surface of the aircraft whereon the body is positioned.

11. The aircraft according to claim 9, in which said panel is secured to the aircraft by a fastener.

12. The panel according to claim 1, wherein said body is adapted to rotate about a longitudinal axis of said body, the longitudinal axis being coaxial with a normal to the surface of the aircraft on which the body is positioned, said panel remaining stationary with respect to the surface of the aircraft on which the body is positioned while the body rotates.

* * * * *